United States Patent [19]
Manyek

[11] 3,848,513
[45] Nov. 19, 1974

[54] TANDEM WHEEL TRUING MACHINE

[75] Inventor: Leonard F. Manyek, Lansing, Ill.

[73] Assignee: Stanray Corporation, Chicago, Ill.

[22] Filed: May 12, 1972

[21] Appl. No.: 252,709

[52] U.S. Cl............................ 90/16, 51/104, 51/236, 82/4 E, 82/8
[51] Int. Cl. .............................................. B23c 3/04
[58] Field of Search................. 90/20, 16; 82/4 E, 8; 51/104, 106 R, 132, 236

[56] References Cited
UNITED STATES PATENTS

| | | | |
|---|---|---|---|
| 2,622,378 | 12/1952 | Stanley et al. ........................ | 51/236 |
| 2,823,493 | 2/1958 | Stanley ............................ | 51/236 X |
| 3,044,368 | 7/1962 | Bloss .................................... | 90/16 |

*Primary Examiner*—Andrew R. Juhasz
*Assistant Examiner*—Z. R. Bilinsky
*Attorney, Agent, or Firm*—Sabin C. Bronson

[57] ABSTRACT

A wheel truing machine for simultaneously truing two lengthwise spaced wheels of a vehicle. The machine includes a fixed wheel truing assembly. A movable wheel truing assembly is lengthwise positionable relative to the fixed assembly to adjust the spacing therebetween to the wheel spacing. A biasing means for accommodating extreme out-of-roundness conditions permits limited increase in the spacing after the movable assembly is located in its lengthwise position. The track structure is constructed to provide continuous trackage when required.

9 Claims, 16 Drawing Figures

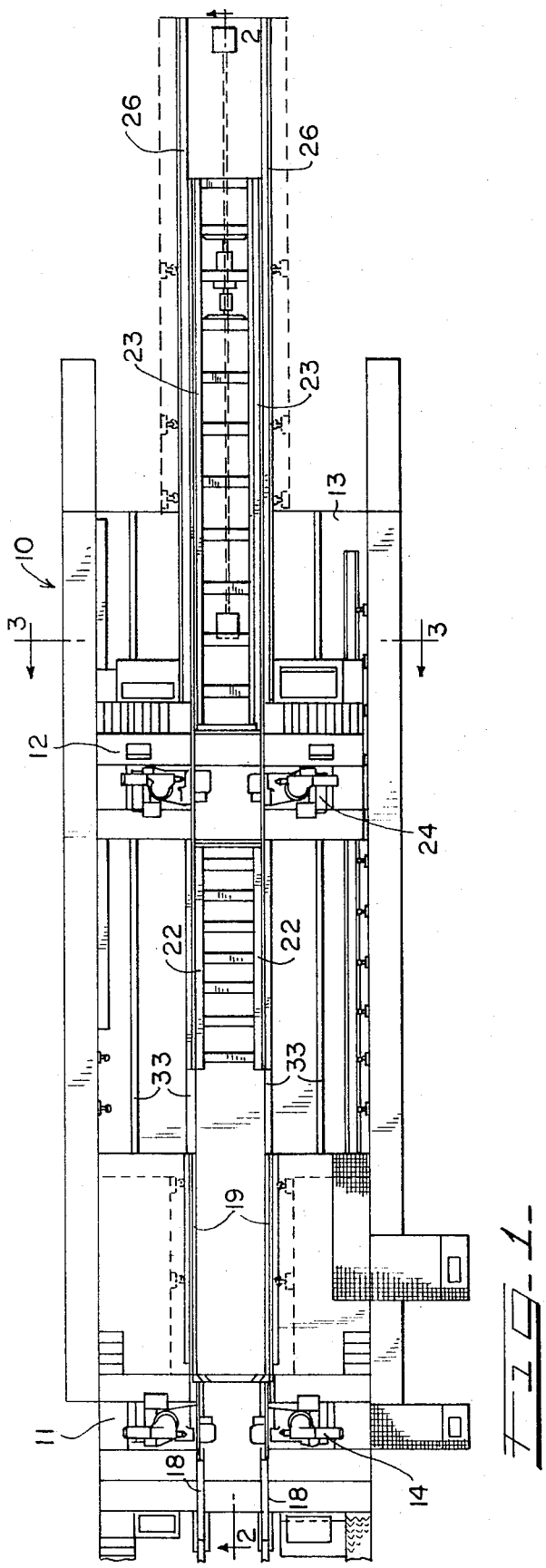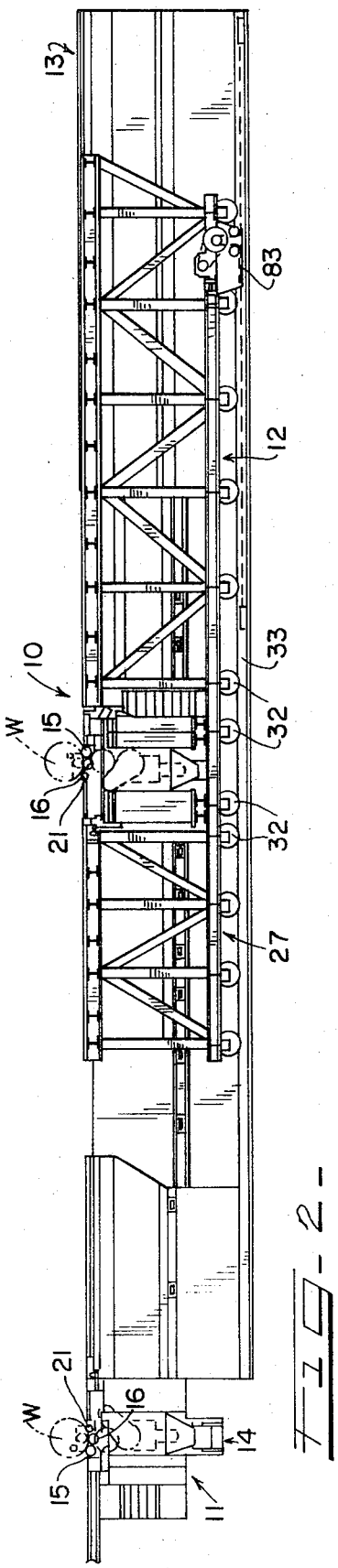

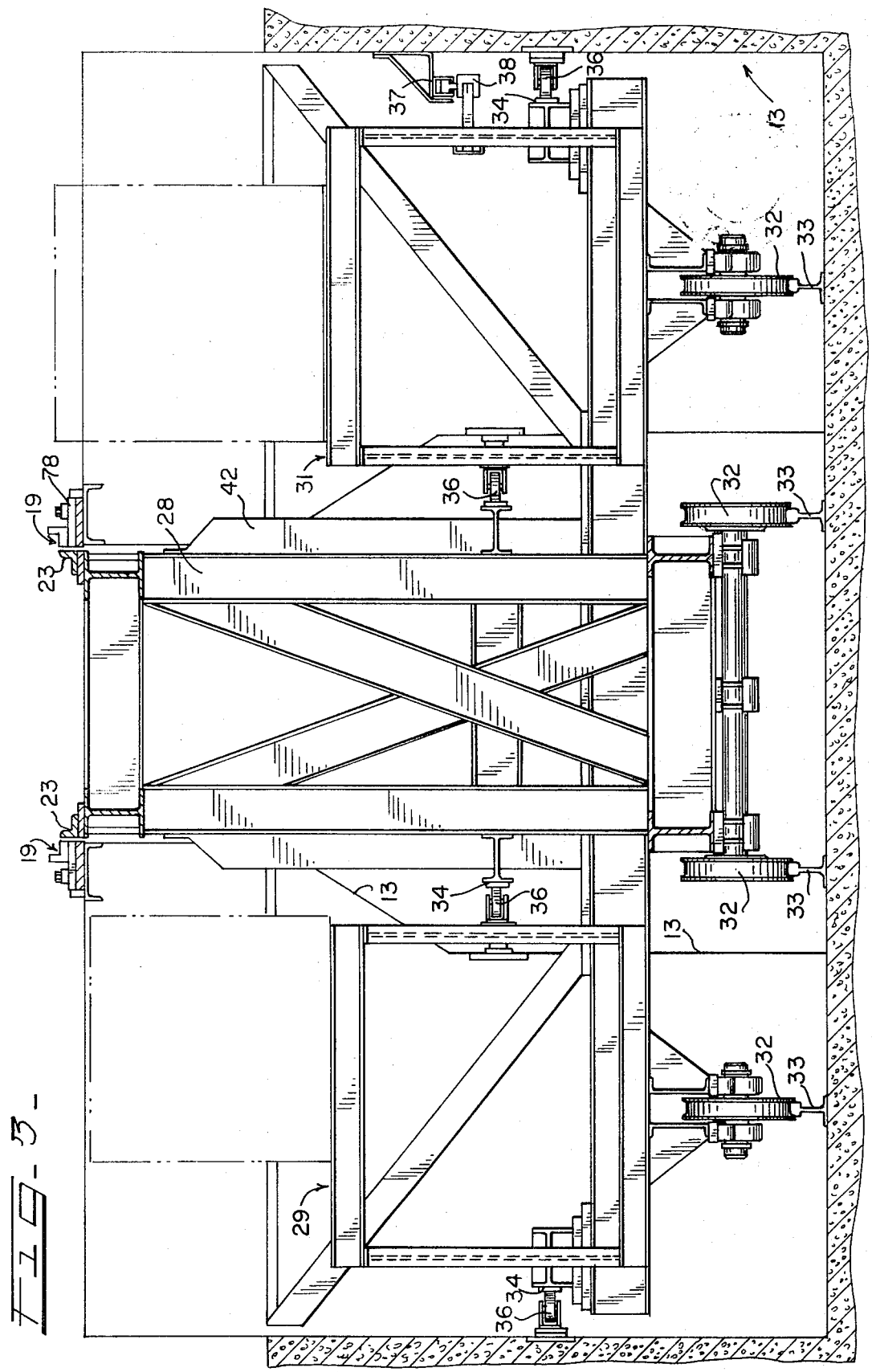

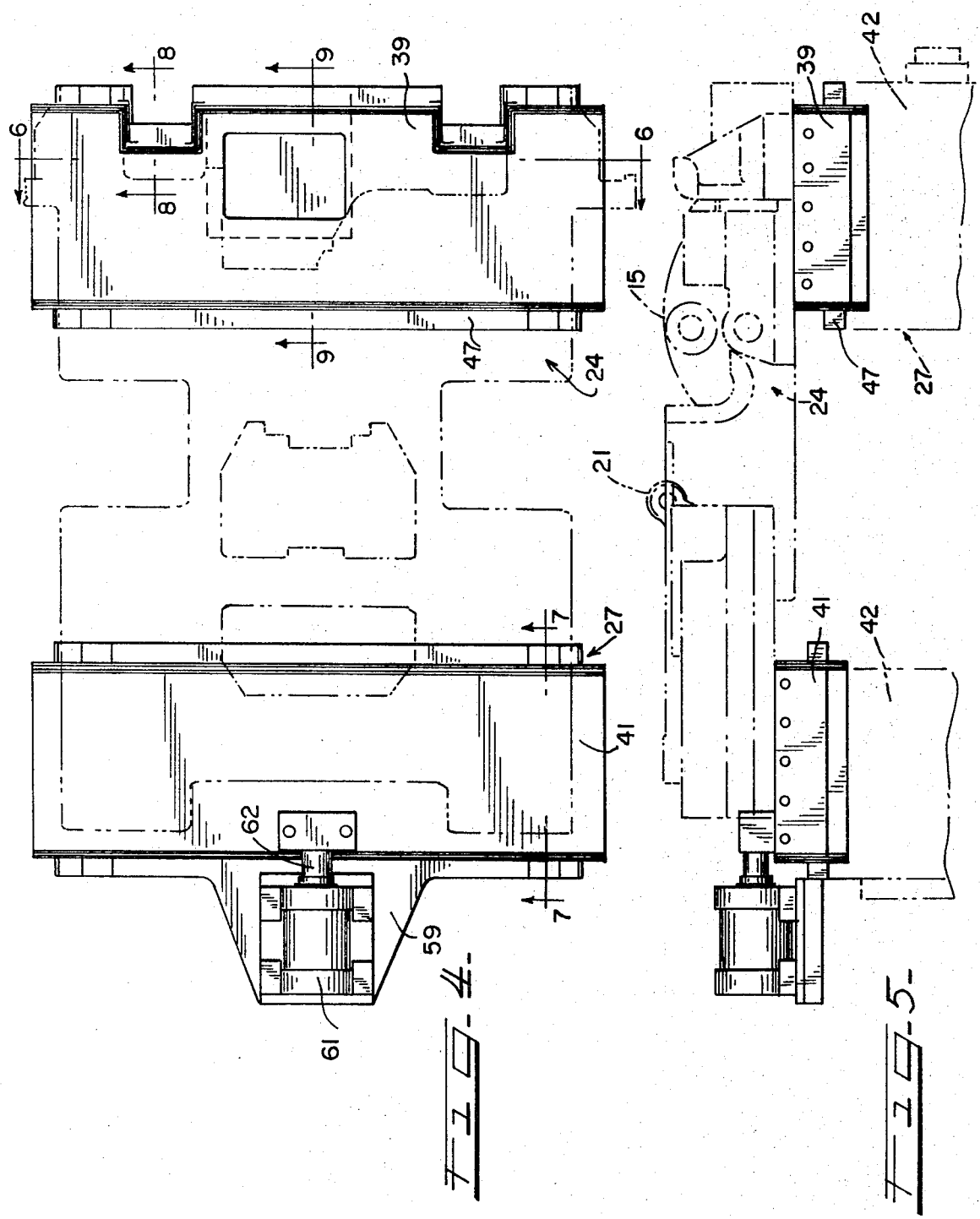

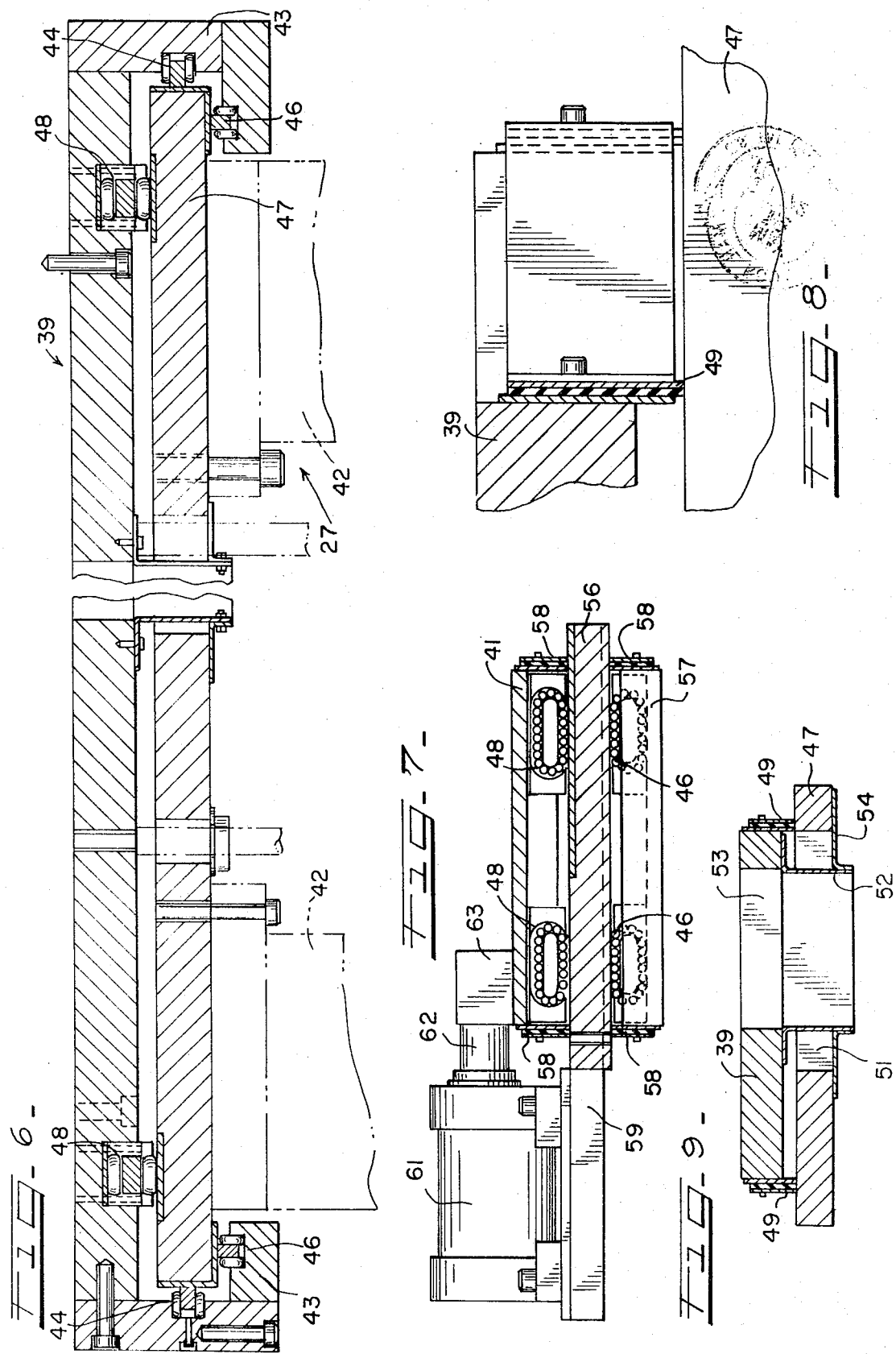

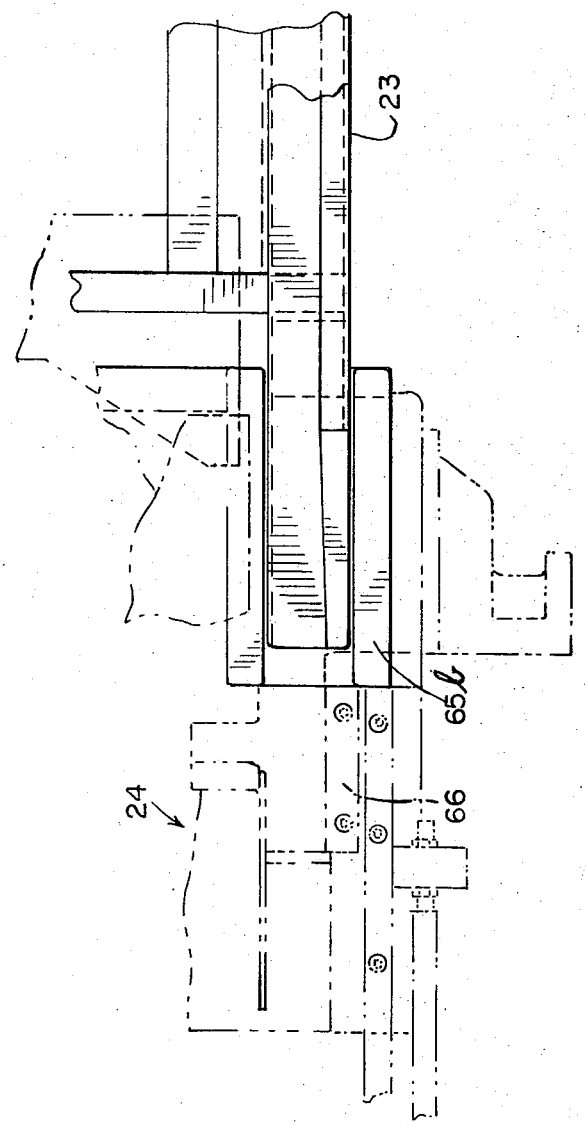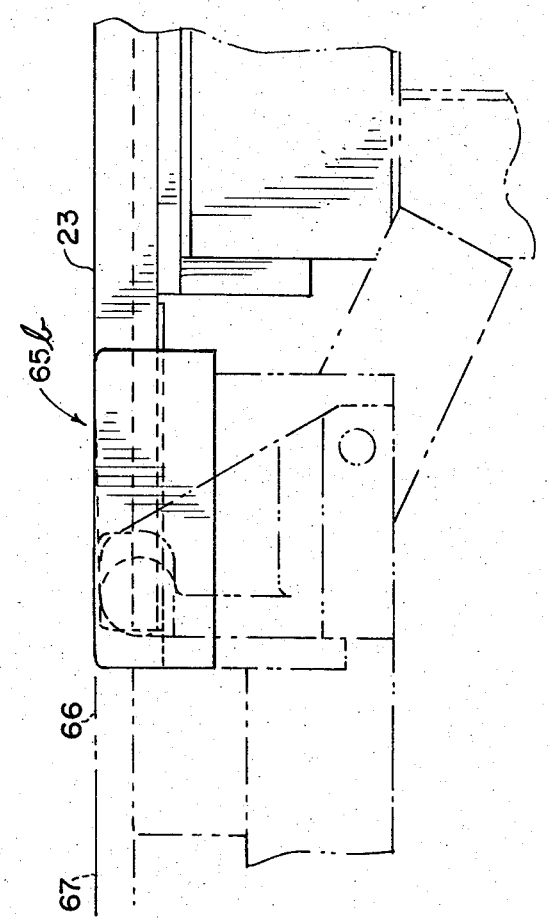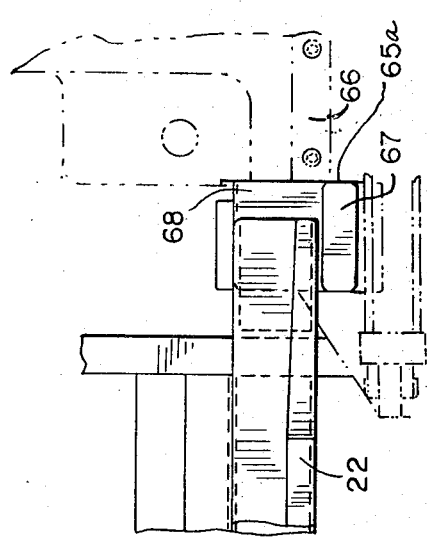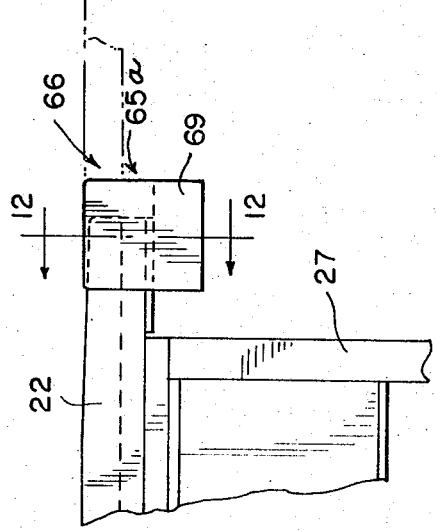
Fig. 10
Fig. 11

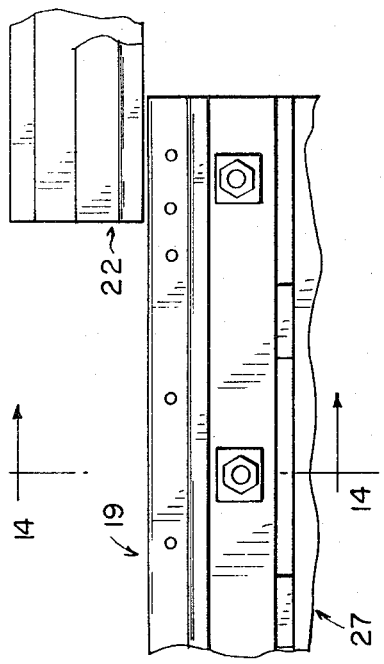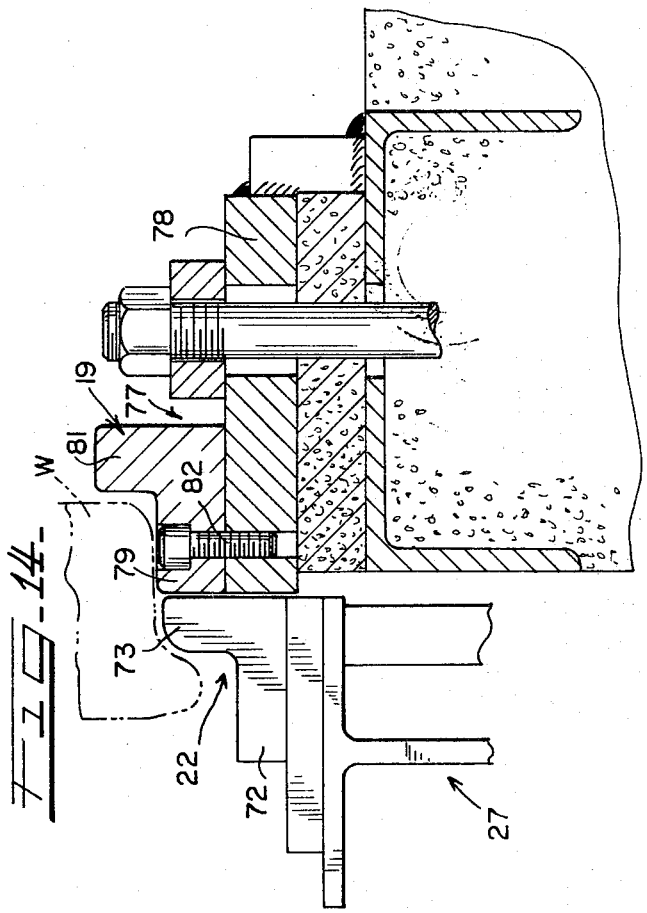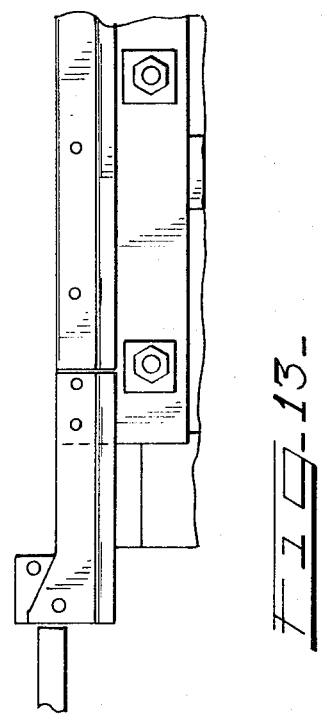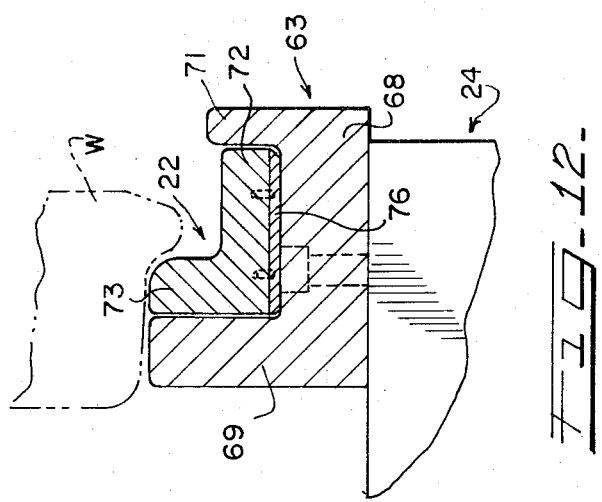

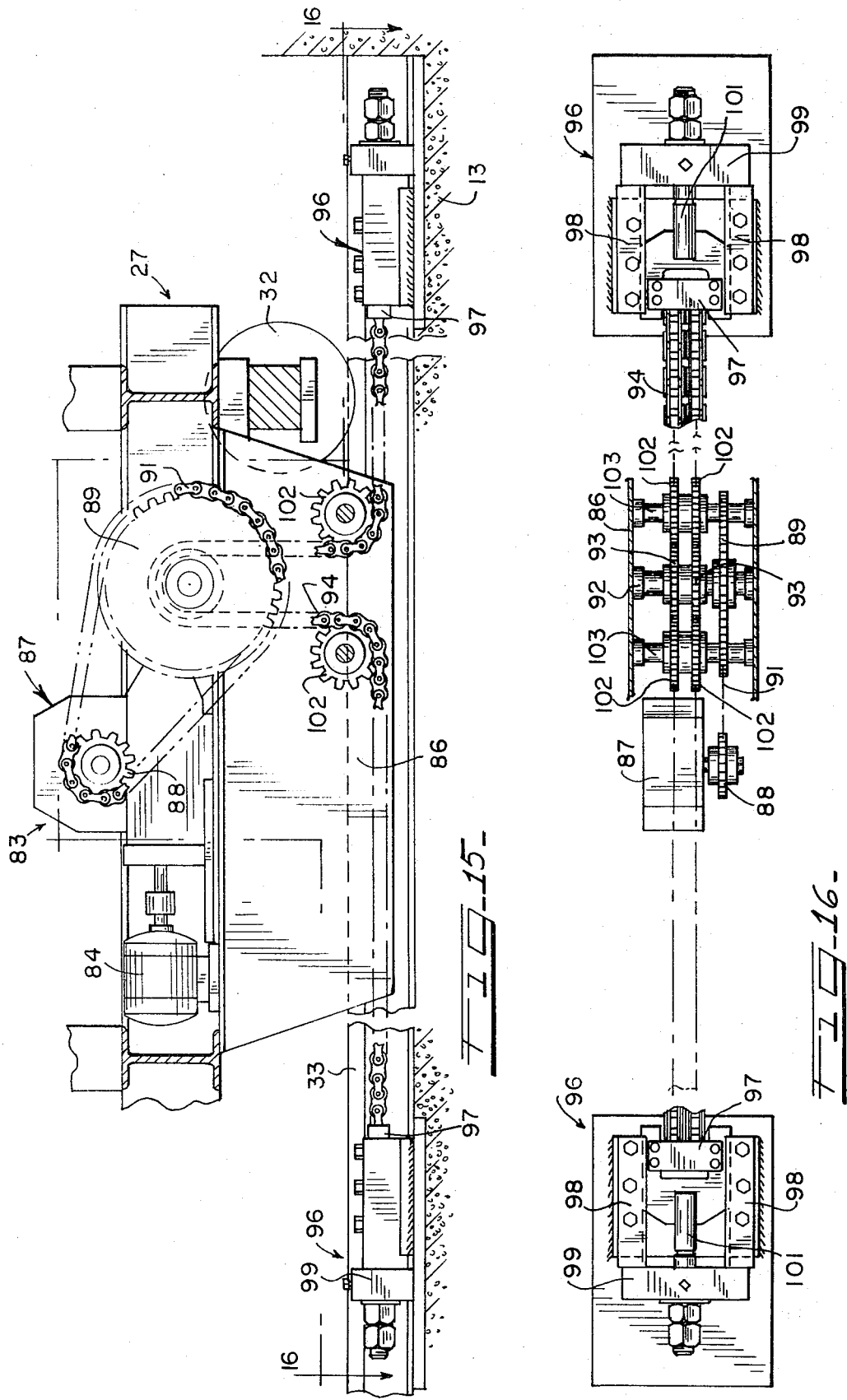

TANDEM WHEEL TRUING MACHINE

BACKGROUND — SUMMARY — DRAWINGS

The present invention relates to truing apparatus for use in refinishing wheels of railway equipment including locomotives, passenger and freight cars, transit cars, and the like. More particularly, the truing apparatus is adapted for use in simultaneously truing two lengthwise sets of wheels that are normally spaced lengthwise of the vehicle.

Wheel truing machines of this general type with which the present invention is concerned are described in U.S. Pat. Nos. 2,622,374; 2,622,378; 2,645,003; 2,727,343; 2,781,615; 3,174,402 and 3,540,164. The above mentioned patents relate to a wheel truing apparatus for truing only a single set of wheels located on the opposite sides of the vehicle. With this apparatus the vehicle must be moved lengthwise each time another set of lengthwise spaced wheels is to be trued. This is time-consuming and requires considerable set-up time. The set-up involves the use of manpower which increases the labor costs of the operation.

By the present invention it is proposed to provide an apparatus which overcomes the problems as encountered heretofore.

This is accomplished by the provision of a new and novel arrangement for using two of the aforementioned types of wheel truing machines so that two sets of wheels along opposite sides of the vehicle and spaced lengthwise thereof may be simultaneously trued.

The single wheel truing machine of the type shown in the aforesaid patents includes generally a finishing tool, a drive means for turning the wheel, and a tool locating means for locating the tool relative to the periphery of the wheel. The finishing tool is a cutter such as a milling tool or the like. The drive roller engages the car wheel and drives it, and may support some or all of the weight or load on the car wheel. The tool locating means serves to locate the tool with respect to the wheel center to provide a true cut which is equidistantly spaced from the center and thereby provide a wheel circumference or surface having a constant radius. The tool locating means is preferably adjustable so that the depth of cut may be adjusted.

A common support structure contains the idler rollers and the drive rollers to support and rotate the wheels during the cutting operation. Also contained in the structure are the slide rails which are retractable to provide access for the cutting tools. Further included in the structure is a universal joint connection for suspending a C-frame shaped structure which contains the cutting tools and tool locating means which engage the axle center. The universal joint connection allows the C-frame structure to move in space so that the tool locating means can follow the axle centers which are constantly moving in space due to the continuing changing shape of the wheel as metal is removed from the wheel flange which contacts the drive rollers and idler rollers.

The structure of the present invention uses two of the above described wheel truing machines of which one machine is stationary and of which the other machine is mounted on a transverse frame for lengthwise movement relative to the stationary machine. The movable machine is thereby positionable so as to accommodate the distance between the lengthwise spaced pairs of wheels adapted to be trued.

The stationary wheel truing machine or assembly includes track means for guiding and supporting the vehicle wheels; and the movable wheel truing assembly includes lengthwise movable track that is retractable and extendable relative to the stationary track means for providing either a continuous track or spaced track means.

Power means are provided for moving the movable wheel truing apparatus. The power means includes a novel drive which serves to hold the movable wheel assembly fixed when it is in the desired lengthwise position relative to the stationary wheel truing assembly.

The movable wheel truing assembly also includes yieldable power means for mounting the truing unit or machine so that it is capable of adjusting lengthwise to the continuing changes in location of the axle centers of the lengthwise spaced wheelsets thereby allowing the drive rollers and idler rollers of both the fixed and movable machines to remain in contact with their respective wheelset.

Further advantages of this invention will become evident as the description proceeds and from an examination of the accompanying drawings which illustrate the embodiment of the invention and in which like reference numerals refer to like parts throughout the several views.

FIG. 1 is a top plan view of a wheel truing installation embodying the structure of the present invention;

FIG. 2 is a side elevational view of the installation taken generally along the lines 2—2 of FIG. 1 and showing in phantom lines lengthwise spaced wheels of a vehicle in a position for simultaneous truing thereof by the wheel truing units;

FIG. 3 is a cross sectional view taken generally along the lines 3—3 of FIG. 1 showing the movable carriage or transverse table structure on which one of the wheel truing units is mounted;

FIG. 4 is a top plan view on an enlarged scale of the movable platform on which one of the wheel truing units is mounted and with the top plan profile of the wheel truing unit and the central frame section of the transverse table shown in phantom;

FIG. 5 is a fragmentary elevational view of the structure shown in FIG. 4;

FIG. 6 is a fragmentary cross sectional view on an enlarged scale taken generally along the lines 6—6 of FIG. 4 and showing in particular the movable platform on which one end of the wheel truing unit is mounted;

FIG. 7 is a fragmentary cross sectional view on an enlarged scale taken generally along the lines 7—7 of FIG. 4 showing the platform structure of the central frame section of the transverse table and the yieldable means for permitting limited movement of the platform on which the wheel truing unit is mounted;

FIG. 8 is a cross sectional view taken generally along the lines 8—8 of FIG. 4;

FIG. 9 is a cross sectional view taken generally along the lines 9—9 of FIG. 4;

FIG. 10 is a fragmentary plan view of the adjacent ends of the tracks carried by the transverse table and the wheel truing assembly carried by the movable platform;

FIG. 11 is a side elevational view of the structure shown in FIG. 10;

FIG. 12 is a cross sectional view taken generally along the lines 12—12 of FIG. 11;

FIG. 13 is a fragmentary elevational view of the track structure adjacent to the foundation structure and fixed wheel truing assembly.

FIG. 14 is a cross sectional view taken generally along the lines 14—14 of FIG. 13 showing the relationship of the inner half rails carried by the transverse table and the outer half rails carried by the foundation structure;

FIG. 15 is a fragmentary elevational view on an enlarged scale of the drive means for driving the movable wheel truing assembly; and FIG. 16 is a top plan view of the drive means shown in FIG. 15.

Referring now to the drawings, in particular to FIGS. 1 and 2, there is shown the tandem wheel truing installation 10 embodying the structure of the present invention. The installation 10 comprises generally a fixed wheel truing assembly 11 and a movable wheel truing assembly 12 which is selectively positionable so that two lengthwise spaced wheels W may be simultaneously trued. The fixed assembly 11 and movable wheel truing assembly 12 are each mounted on a foundation.

The fixed wheel truing assembly 11 is substantially identical to that described in connection with FIGS. 12-33 of the aforementioned U.S. Pat. No. 2,622,374 and may incorporate many of the features described in the other aforementioned patents. The assembly includes a wheel truing machine or unit 14 having a wheel lifting means and drive roller 15 to rotate the wheel, idler roller 21 and a cutter 16 for cutting, or truing the periphery of the vehicle wheel W supported on the assembly 11 as described in the aforementioned U.S. Patent. In this connection it should be mentioned that the details of the wheel truing unit 14 and assembly 11 do not form a part of the present invention except in combination with the dual or tandem wheel truing machine. For a more detailed description of the assembly 11 and the unit 14, reference may be had to U.S. Pat. No. 2,622,374.

The pit 13 as shown is found below the track level on which the wheeled vehicle travels and is sufficiently long to accommodate the lengthwise movement of the movable wheel truing assembly 12. The section of the pit 13 adjacent to the fixed wheel truing assembly has a trackway including a pair of tracks 18 connecting to shop tracks. A pair of outer tracks 19 mounted on the pit foundation at the opposite end of the fixed assembly 11 telescopes with mating inner tracks 22 of the movable assembly 12. A further pair of inner tracks 23 are on the opposite side of a wheel truing unit 24, which is substantially identical to the wheel truing unit 14.

The inner tracks 23 coact or cooperate with outer tracks 26 mounted on the pit foundation at the entrance to the installation 10. The tracks 26 merge with the tracks in the shop or yard in which the installation is to be located. A more detailed description of the tracks will appear hereinafter.

As shown, the wheel truing unit 24 is mounted on a movable frame or transverse table as shown in particular in FIGS. 2 to 9. The frame 27 comprises a center section 28 and two outboard sections 29 and 31. The outboard sections 29 and 31 support the operation and auxillary equipment for operating the wheel truing unit 24 mounted on the center section 28.

The center section 28 and outboard sections include support wheels 32 which are rollable on tracks 33 located on the base of the pit 13. Laterally projecting guide plates 34 on the center section 28 and outboard sections 29 and 31 are engageable with guide wheels 36 on the pit side wall, further serving to guide the movable frame 27 lengthwise within the pit 13.

An electrical bus bar 37 is supported on the pit side wall and is engaged by a roller contact 38 which is connected to the motors for operating the wheel truing unit 24 and transverse table drive system 83.

The wheel truing unit 24 is mounted on the movable frame supported on the center section 28 and the side sections 29-31, and is arranged so that the structure supporting the wheel lifting means and idler rollers is movable toward or away from the fixed wheel truing unit 14. To this end, a pair of lengthwise spaced platforms 39 and 41 respectively are supported on complementary spaced upright supports 42—42 on the movable frame 27.

The platform 39 as shown in particular in FIGS. 4, 5 and 6 includes a guide flange 43 along each of the side edges. The side flanges 43 have grooves which receive side rollers 44 and bottom rollers 46 which contact respectively on the side and bottom edge of a support plate 47 fixed to the upstanding supports 42. The platform 39 also includes roller bearings 48 seatable in the underside thereof and rolling on the upper surface of the plate 47. To accommodate equipment from the wheel truing unit 24 that requires a recess, the support plate 47 may be provided with an enlarged cut-out 51 and the platform 39 may be provided with a shield depending from the edges of an opening 53. A protective flange 54 may be fixed to the shield 52 and slidably engage the under side of the fixed plate 47.

Referring now to FIGS. 4, 5 and 7 the platform 41 is slidable on a fixed plate 56 attached to one of the upright supports of the movable frame. Guide flanges similar to the guide flange 43 shown in FIG. 6 may be attached to the lengthwise extending sides of the platform. Plates 49, FIGS. 8 and 9, are backup plates for neoprene wipers and bronze scrapers to keep the chips and dirt out.

Fixed to a plate extension 59 projecting from the plate 56 is a hydraulic piston unit 61. The piston unit 61 includes a shaft 62 having an end fixed to a block 63 that is securely attached to the upper face of the platform 41. The hydraulic unit resists movement of the platforms 41 and 39, which is connected by the wheel truing unit 24 toward and away from the fixed wheel truing unit 14. As shown, the wheel truing unit 24 which is similar to the wheel truing unit 14 includes cutting tools 16 which are operative to simultaneously cut the lengthwise spaced wheels W.

During the cutting operation the movable wheel truing unit 24 is allowed to float lengthwise relative to the fixed wheel truing machine. This permits the structure carrying the drive rollers 15 and the idler rollers 21 to adjust lengthwise in order to maintain contact with the wheel periphery even though the wheel shape is continually changed due to metal being removed from the wheel flange or initial eccentricity to further insure contact of the wheel flange with the drive roller 15, the hydraulic cylinder 61 applies a force lengthwise to the platform 41 in the direction of the fixed wheel truing machine 14. Since the drive rollers 15 on the fixed machine 14 and movable machine 24 are to the opposite side of the spaced wheelsets, the force induced by cylinder 61 is transferred through the frame of the vehicle to the drive roller 15 on the fixed machine 14 as well. The hydraulic circuit for cylinder 61 includes a pressure relief valve at a predetermined pressure setting. When a load is induced by the wheelsets that overcomes the force induced by cylinder 61, the platform 39 and 41 can move away from the fixed wheel truing machine. In this manner the wheel W is contacting both the idler rollers 21 and maintaining a preload on drive rollers 15 to prevent any possible damage to the cutters 16.

Referring to FIGS. 10-14 there is shown some of the details of construction of the track structure employed in connection with the movable wheel truing assembly. As shown generally in FIGS. 10 and 11 the movable frame or carriage 27 includes the forward inner tracks 22 and the rear inner track section 23 lengthwise spaced therefrom to provide a space therebetween for the wheel truing unit 24. The wheel truing unit 24 includes tracks 66 and 67 which are movable lengthwise to each other so as to permit the milling cutter 16 to engage the wheel W as fully explained in the aforementioned U.S. Pat. Nos. 2,622,374 and 2,622,378.

The tracks 66 and 67 terminate in substantially U shaped channels 65a and 65b each having a horizontal base 68. An outer leg 69 is of greater height than an inner leg 71, to form a transition track between tracks 66 and 22. The channels 65a and 65b are spaced to accommodate the conventional flanged railway car wheel therebetween.

The channels 65a and 65b, which are fixed to lengthwise movable wheeltruing unit 24, respectively slidably receive the ends of inner rails 22 and 23. As shown the inner rails 22 and 23 are both of angular cross section. The base leg 72 is fixed and supported on uprights of the movable frame 27. An upright leg 73 is located so as to lie adjacent to the outer rails 19 or 26 fixed to the foundation as shown in FIG. 14.

The tracks 22 and 23 mounted on the transverse table 27 are the inner half of a complete track assembly of which outer halves 19 and 26 are fixed to the foundation along the pit wall. As shown in FIGS. 13 and 14 the outer halves 19 and 26 of the track assemblies include the tracks 19 and 26, both suitably attached to a base plate 78 fixed as by a bolt to the rods embedded in the foundation. The tracks 19 and 26 are of angular cross section and includes a base leg 79 and an upright leg 81. The angle or track is attached to the base plate 78 by means of bolts 82.

The ends of the tracks 22 and 23 may each have wear plates 76 attached to the underside of the base 72. The wear plates 76 permit and facilitate sliding movement of the tracks 21 and 22 thereon. In this manner the wheels of the railway vehicle easily traverse from the tracks on the transverse table 27 to the tracks on the unit 24. The track halves 19 and 22 and halves 23 and 26 at the opposite end of the table 27 coact so that the wheel tread is supported either on the base leg 79 or the upper end of leg 73 of the inner halves 22 and 23 as shown in FIG. 14. At times the wheelset is rolling only on the outer half tracks, 19 and 26. The upright leg 81 prevents the wheelset from shifting sideways and coming off of the base legs 79.

Referring now to FIGS. 15 and 16, there is shown the drive means 83 for selectively locating the movable frame 27 lengthwise in the pit so that the distance between the fixed wheel truing unit 14 and the wheel truing unit 24 is substantially the same as the distance between the wheels to be trued. The drive means 83 includes a motor 84 suitably mounted on a support frame 86 located along the longitudinal axis of the movable frame 27. The motor 84 drives a gear or speed reduction unit 87 which drives a sprocket. The sprocket 88 drives sprocket 89 by way of a sprocket chain 91.

The sprocket 89 is fixed to a rotatable shaft 92 journaled at the opposite ends thereof in the support frame 86. A pair of transverse spaced drive sprockets 93—93 are fixed to shaft 92 and mesh with drive sprocket chain 94. The sprocket chain 94 is fixed at the opposite ends thereof to tautening assemblies 96. The tautening assemblies 96 are each mounted on the base of the pit 13 and include a fastening block 97 which is slidably guided for lengthwise adjustment by laterally spaced guides. A rear bracket plate 99 supports an adjustment rod 101 which is fixed at one end to the fastening block 97. The other end of the adjustment rod 101 has a lock nut arrangement threaded thereon so that the slide block 97 may be selectively positioned so as to adequately tauten the sprocket chain 94.

The sprocket chain 94 is also trained about idler sprockets 102—102 disposed on opposite sides of trained sprocket drive shaft 92. The idler sprockets 102—102 are rotatable with shafts 103 journaled in the frame 86.

In operation upon actuation of the motor 84, the speed reduction unit is driven so that the sprocket 88 is rotated. This causes the drive 89 to be rotated by the sprocket chain 91 and thereby the sprockets 93—93. The rotating sprockets 93—93 mesh with the respective sprocket chains 94—94 that is tautened and fixed to the foundation so that the movable frame into which the sprockets 93—93 is supported is operative to drive the movable frame lengthwise within the pit on the tracks 33.

Assuming now that it is desired to true the lengthwise spaced wheels of a locomotive or some other type of railway vehicle, the transverse table 27 is moved to a position such that both the front inner half rails 22 overlap the outer half rails 19 and the rear inner half rails 23 overlap the outer half rails 26. In this manner a continuous track is provided along the length of the installation.

The locomotive is moved in from the tracks 26 to position the lead pair of wheels over the fixed truing unit 14. At this time the lead wheels are lifted and the track of the unit 14 retracted from engagement with the wheels. This locks the locomotive in the desired or correct position.

The transverse table 27 is now moved under the locomotive to locate the wheel truing unit 24 lengthwise relative to the fixed wheel truing unit 14. The hydraulic unit 61 is activated so that the wheel truing unit 24 is biased toward the fixed unit 14. Thereafter both units 14 and 24 are activated so that both wheels are simultaneously turned true.

If it is desired to true successive wheels the locomotive is merely pulled forward. Only minor corrections will be required in the location of the transverse table 27 because generally locomotives have a consistent wheel pattern.

When the last wheels on the locomotive are completed, the wheel truing units 14 and 24 are returned to the normal non-operating condition as described in the aforementioned patents. The transverse table 27 is then moved so that there is continuous length of track along the pit. The locomotive may then be pulled off the installation and another thereafter pulled on to repeat the cycle.

In the drawings and specifications there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A tandem wheel truing installation for simultaneously truing lengthwise spaced wheels of a vehicle, said installation comprising a foundation, a first wheel truing assembly fixedly mounted on said foundation, track means for guiding said vehicle wheels, a second wheel truing assembly, track means extendable with said track means on said first wheel truing assembly for providing a continuous track along said foundation, means mounting said second wheel truing assembly for lengthwise movement relative to said first wheel truing assembly, and means for maintaining said second wheel truing assembly in a selective stationary position relative to said first wheel truing assembly, whereby said first and second wheel assemblies are spaced complementary to the lengthwise spacing of the vehicle wheels to be trued.

2. The wheel truing installation as defined in claim 1 wherein said installation includes power means for moving said second wheel truing assembly lengthwise of said foundation.

3. The wheel truing installation as defined in claim 2 wherein said power means comprises a motor fixed to said second wheel truing assembly, a sprocket wheel driven by said motor, said sprocket engaging a sprocket chain extending lengthwise of said foundation whereby said rotating sprocket engageable with said sprocket chain moves said second wheel truing assembly along said foundation toward and away from said fixed wheel truing assembly.

4. The wheel truing installation as defined in claim 3 wherein said sprocket chain extends over said sprocket and wherein said sprocket in engagement with said sprocket chain retains said second wheel truing assembly selectively positioned relative to said first wheel truing assembly when said motor is stopped.

5. The wheel truing installation as defined in claim 1 wherein said first and second wheel truing assemblies each comprise a unit including means for cutting said wheel peripheries.

6. The wheel truing installation as defined in claim 5 wherein said second wheel truing assembly includes means for permitting limited lengthwise movement of said second wheel truing unit mounted thereon, thereby enabling said second wheel truing unit to position itself correctly so that the drive rollers and idler rollers of the said first and second wheel truing units maintain contact with said wheel peripheries during said wheel cutting regardless of the shape of said wheel peripheries.

7. The invention as defined in claim 6 wherein said means mounting said unit for limited lengthwise movement on said second wheel truing assembly includes a lengthwise movable platform means supporting said second wheel truing assembly, and biasing means applying a predetermined preload force to said platform means thereby applying a preload force between the drive rollers of both said first and second wheel truing assemblies and said wheel peripheries and at the same time said platform means is rendered movable and is controlled by the shape of said wheel peripheries in that if the wheel load decreases on the drive rollers the platform means will move in the direction of the applied preload force in order to maintain the predetermined force and the platform means will move in the opposite direction if the wheel load on the drive rollers increases sufficiently to overcome the preload force.

8. In a wheel truing installation including a foundation, a fixed wheel truing assembly and a selectively positionable and lengthwise movable wheel truing assembly, said foundation supporting said fixed and said movable wheel truing assemblies, a track system on said foundation, said track system comprising fixed track defining an outer half of a track assembly and being capable of providing the support for vehicle wheels, and a track mounted on said movable wheel truing assembly and defining an inner track half capable of supporting said vehicle wheels, said inner and outer track halves being complementary so that when in overlapping relationship both support the vehicle wheels.

9. In a wheel truing machine including a foundation, a fixed wheel truing assembly mounted thereon, a movable wheel truing assembly having track means of substantially rectangular cross section supported thereon for lengthwise movement therewith with respect to said foundation, and fixed track means of substantially right angular cross section supported on said foundation, the combination therewith of a transition section comprising a member of substantially U-shaped cross section having a base and two upstanding legs with one of said legs being substantially the same height as one of the legs of said right angular track means mounted on said movable wheel truing assembly, said right angular track means of said movable wheel truing assembly being slidably accomodated between the two upstanding legs of said transition member.

* * * * *